(12) United States Patent
Solcz (10) Patent No.: US 9,153,055 B2
(45) Date of Patent: Oct. 6, 2015

(54) COLOR CONTENT IN DOCUMENT RENDERING FOR COLORBLIND USERS

(71) Applicant: XEROX CORPORATION, Norwalk, CT (US)

(72) Inventor: Edward J. Solcz, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 142 days.

(21) Appl. No.: 13/926,331

(22) Filed: Jun. 25, 2013

(65) Prior Publication Data

US 2014/0380154 A1   Dec. 25, 2014

(51) Int. Cl.
*G06K 9/00* (2006.01)
*G06T 11/60* (2006.01)
*G06T 11/00* (2006.01)
*G06F 3/0481* (2013.01)

(52) U.S. Cl.
CPC .............. *G06T 11/60* (2013.01); *G06F 3/0481* (2013.01); *G06T 11/001* (2013.01)

(58) Field of Classification Search
None
See application file for complete search history.

(56) References Cited

U.S. PATENT DOCUMENTS

| 6,032,004 | A | 2/2000 | Mirabella, Jr. et al. |
| 7,145,571 | B2 | 12/2006 | Jones et al. |
| 7,605,930 | B2 | 10/2009 | Suzuki et al. |
| 8,350,869 | B1 | 1/2013 | Borg |
| 8,400,691 | B2 | 3/2013 | Shibusawa |
| 8,422,071 | B2 * | 4/2013 | Shimamura et al. ........... 358/1.9 |
| 2002/0138249 | A1 * | 9/2002 | Kanevsky et al. ................. 704/2 |
| 2004/0027594 | A1 * | 2/2004 | Suzuki et al. .................. 358/1.2 |
| 2005/0102734 | A1 * | 5/2005 | Daniel et al. ...................... 2/239 |
| 2006/0071938 | A1 * | 4/2006 | Richardson et al. ........... 345/591 |
| 2009/0128871 | A1 * | 5/2009 | Patton et al. .................. 358/520 |
| 2011/0229023 | A1 * | 9/2011 | Jones et al. ................... 382/162 |
| 2013/0027420 | A1 * | 1/2013 | Felt .............................. 345/594 |

FOREIGN PATENT DOCUMENTS

| EP | 1 453 008 | 1/2004 |
| WO | 2007/111995 | 10/2007 |

OTHER PUBLICATIONS www.AcmeCorp.com, 1 page, Jun. 6, 2013.

* cited by examiner

*Primary Examiner* — Sean Motsinger
(74) *Attorney, Agent, or Firm* — Gibb & Riley, LLC (57) ABSTRACT

Methods and devices receive color settings into a computerized device. The color settings can identify at least one first color that is indistinguishable from at least one second color by a user. Such methods and devices also receive instructions into the computerized device to output an item has at least one feature having a feature color. Based on the feature color being included within the color settings, these methods and devices automatically alter the item using the computerized device by optionally changing the feature color to a black-based color and automatically adding text to the feature in the altered item using the computerized device. The added text describes the feature color. Also, such methods and devices output the altered item from the computerized device.

20 Claims, 7 Drawing Sheets

...with a web address www.AcmeCorp.com and ...

*FIG. 2A*

...with a web address www.AcmeCorp.com and ...

COLOR CONTENT IN DOCUMENT RENDERING FOR COLORBLIND USERS

BACKGROUND

Systems and methods herein generally relate to providing color images to fully or partially colorblind individuals and more particularly to methods and devices that alter features within an original image to allow colorblind individuals to distinguish between differently colored features within the item to be displayed or printed.

Colorblindness affects about 10% of the male population and somewhat less in females, according to the US National Library of Medicine. Depending upon the severity, the observer may not be able to distinguish between reds and greens, blues and yellows, or any color hues in the extreme. Colors are perceived as shades of grey under these conditions. People with colorblindness may have a difficult time interpreting documents in which color is used to convey casual or critical information. For example, blue colored text is sometimes used to indicate a web address or red colored text is used to signify negative numbers in accounting applications.

SUMMARY

Exemplary methods herein receive color settings into a computerized device. The color settings identify at least one first color that is indistinguishable from at least one second color by a user. Such methods also receive instructions into the computerized device to output an item (such as a bar chart) that has at least one feature (such as bars within the bar chart). Based on the feature's color being included within the color settings that are indistinguishable by the user (sometimes referred to herein as "indistinguishable color settings"), these methods automatically alter the item using the computerized device by automatically adding text to the feature and optionally changing the feature color to one or more black-based colors using the computerized device. The added text describes the feature color. Also, such methods output the altered item from the computerized device.

Other methods herein similarly receive color settings into a computerized device. The color settings identify at least one first non-black color that is indistinguishable from at least one second non-black color by a user. These methods receive instructions into the computerized device to output an item having at least one feature. The feature has a feature color based on a colorant other than a black colorant. Based on the feature color being included within the color settings, such methods automatically alter the item into an altered item using the computerized device by automatically adding text to the feature and optionally changing the feature color to a black-based color using the computerized device. The black-based color is based on the black colorant, and the black-based text describes the original feature color. The altered item is then output from the computerized device by being printed, displayed, etc.

The text can be added over the altered item and/or added adjacent the altered item. The text can also be surrounded with a graphical feature. The graphical feature can comprise, for example, lines and/or a shaded region (and such a shaded region can have a black-based color or a non-black-based color).

Exemplary computerized device embodiments herein include, among other items, a user interface and a processor operatively (meaning directly or indirectly) connected to the user interface. The user interface receives color settings. Again, the color settings identify at least one first non-black color that is indistinguishable from at least one second non-black color by a user. The user interface also receives instructions to output an item has at least one feature. Again, the feature has a feature color based on a colorant other than a black colorant.

If the feature color is included as one of the user-indistinguishable colors within the color settings, the processor automatically alters the item into an altered item by adding text to the feature in the altered item and optionally changing the feature color to a black-based color. Again, the black-based color is based on the black colorant and the text describes the feature color. The processor outputs the altered item from the computerized device.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, partial or full colorblindness limits the observer from being able to distinguish between selected pairs of (or all) colors. Therefore, the systems and devices herein incorporate a color substitution scheme based upon user inputs, or more broadly transform color text based or colored business graphics content.

Color is typically encoded into documents in terms of RGB, CIE L*a*b*, CMYK or other coordinates. When displayed or printed, this encoded information typically goes through some form of transformation to provide device dependent instructions on how to render (print or display) the image. It is at this rendering phase that this color substitution scheme is deployed to substitute gray background writing, and also identify the color of the content in simple language, either as background or super/subscripted text based upon user preferences or document complexity. The original color content is converted to grey scale to complete the transformation.

With methods and devices herein image processing is performed to convert color document content into device dependent information for output (either as a printed document or display on a video device). This image processing is responsible, in part, for specifying the device dependent color coordinates (e.g., CMYK, RGB, etc.) and also the positioning on the page of text and graphics. At any point in the process, the user can specify what colors they have difficulty seeing. For example, the user can establish their color preferences once, and such preferences can be automatically recalled each time a color document is displayed or printed. Alternatively, the methods and devices herein can receive user color preferences at the time of the request to print or display the item. These methods and devices enables colorblind users to better interpret document content and provide a way to print more economically on black and white, without losing significant impact of color content within most business documents.

Figure 1A:
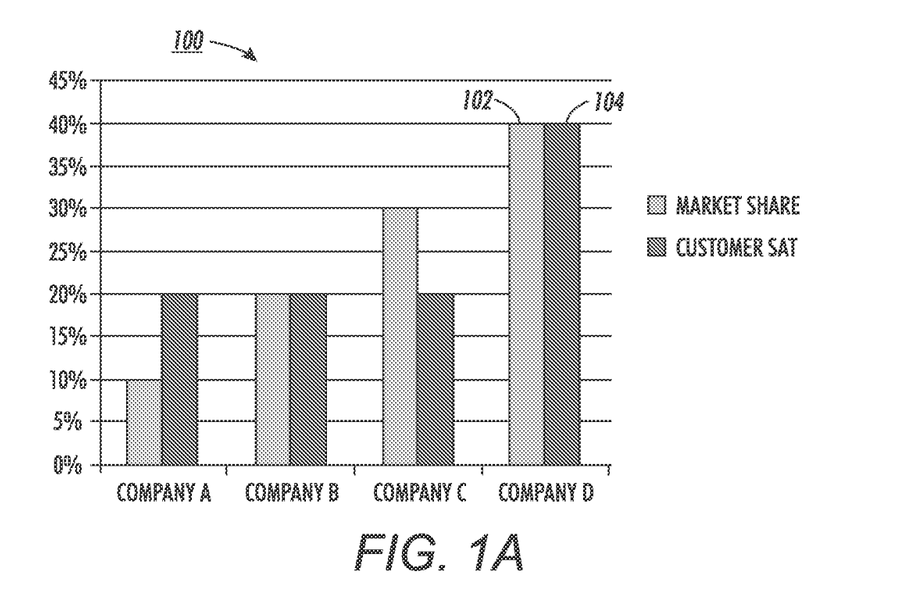
FIG. 1A-1B are schematic diagrams illustrating color items and monochrome items altered using method and devices herein.

A few non-limiting examples produced by methods and devices herein are shown in FIGS. 1A-2G. More specifically, FIG. 1A illustrates a typical column chart 100 containing blue columns 102 and red columns 104. Note that while FIG. 1A is a black and white drawing, items 102 are intended to be illustrated in blue and items 104 are intended to be illustrated in red in FIG. 1A.

Figure 1B:
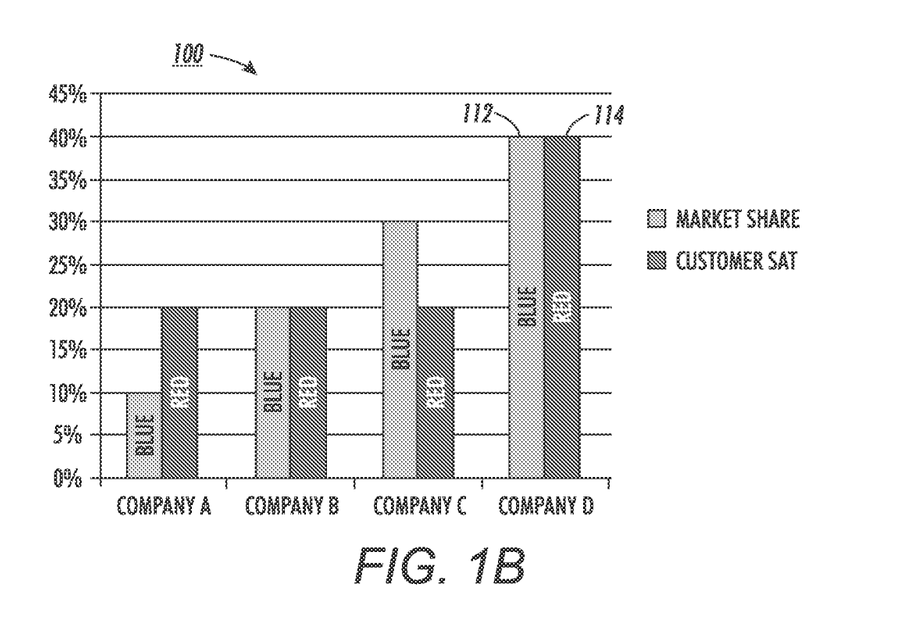

In one example, a user may indicate difficulty distinguishing between the colors red and blue (e.g., the user inputs such indistinguishable color settings). Therefore, the methods and devices herein optionally change the blue columns 102 into light gray columns 112 shown in FIG. 1B; and similarly change the red columns 104 into darker gray columns 114 in FIG. 1B. Further, as also shown in FIG. 1B the word "Blue" is superimposed over the columns 112 and the word "Red" is superimposed over the columns 114. In this way, the methods and devices herein automatically alter the item to be displayed or printed by changing the color of certain features (columns 102 and 104) from their original color into black-based color, such as the shades of gray illustrated in columns 112 and 114 in FIG. 1B; and also adding text on or near the changed features to describe the color of those features (e.g., by putting the name of the color on the features).

Figure 2A:
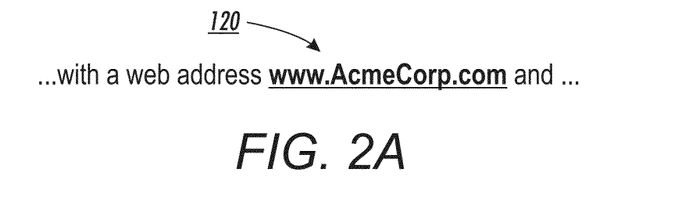
FIG. 2A-2G are schematic diagrams illustrating color items and monochrome items altered using method and devices herein.

In another example, FIG. 2A illustrates colored text 120 (www.AcmeCorp.com) which, in this example, is blue text (even though it is shown as black in the attached black and white drawings). This type of text can sometimes be automatically converted into hyperlinks and given a different color than the remaining text to help identify the hyperlink.

Figure 2B:
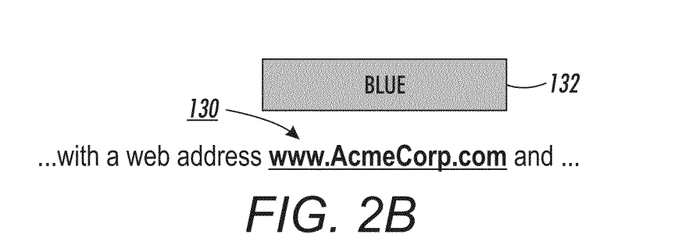

If a user indicates that they have a blue-black colorblindness, the devices and methods herein would establish a color setting for blue-black. Therefore, as shown in FIG. 2B, the blue text 120 is optionally changed to black text 130 and a graphic feature 132 containing a description (the word "Blue") of the color of the text is added to the document. In the example shown in FIG. 2B, the text description 132 is placed within a gray (or potentially non-black color) box to help identify that the text appearing below was originally illustrated in color.

Figure 2C:
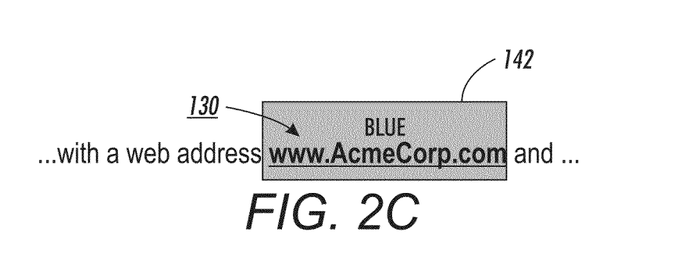
Figure 2D:
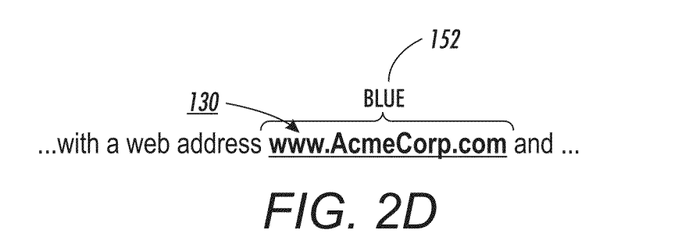
Figure 2E:
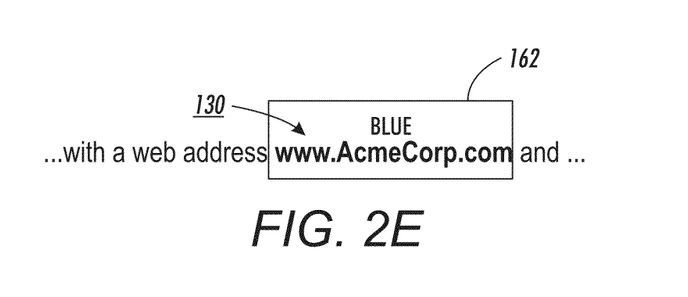
Figure 2F:
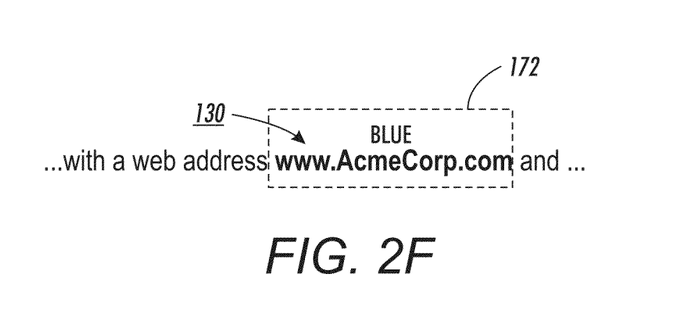
Figure 2G:
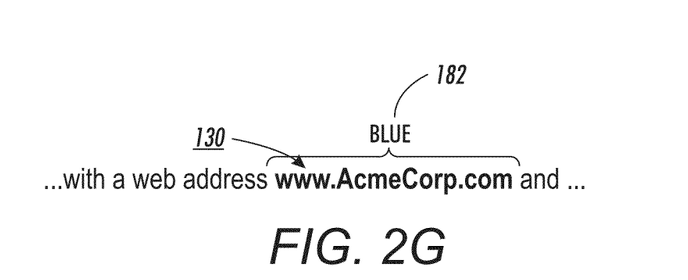

Many types of graphical features could be utilized to indicate that the text 130 was originally a different color than black. For example, as shown in FIG. 2C, the gray box 142 could be sized to include the text 130. Alternatively, as shown in FIG. 2D, no graphic feature is added, and simply the word "Blue" 152 is added above the text 130. Similarly, as shown in FIG. 2E, the graphical feature 162 can simply be a box without background. Alternatively, as shown in FIG. 2F, the border of the graphical feature 172 can be a dashed line. In other examples, as shown in FIG. 2G, the graphical feature 182 can be a bracket indicating which portion of the text was colored blue.

Another issue addressed by devices and methods herein is cost effective printing of documents that have little (e.g., <10%) total color content. In today's office document environment, total cost of ownership and run costs are measures used to assess printing costs. Print engine manufacturers typically enable some form of mechanisms to disengage color marking stations (e.g., cyan, magenta, and yellow photoreceptors, i.e., CMY P/R's) when printing non-color pages (i.e., monochrome/grey scale pages). This reduces wear and tear on color components when not needed for the current print operation. They employ methods to review the color content of print/copy jobs to determine when (i.e., on which pages) to disengage the CMY marking stations, then they issue those commands during the printing process. This in turn requires typically 1-3 seconds (sometimes more time) to disengage the CMY related mechanical apparatus (camming elements away from moving surfaces, relaxing nip forces, stopping rotation, etc). Then the color apparatus is restored to its normal run state for color pages in the job, and again disengaged when monochrome pages are detected. These delays reduce the print systems productivity and can lead to customer dissatisfaction. As a result, some customers do not enable this operation, driving up print costs.

To lower print costs of jobs with little color content, the above-described automatic approach can be used to indicate where color content was located in the color print job, when performing black and white printing. Thus, with devices and methods herein, when a color print job is processed as a black and white print job on color print systems, the color content is transformed to grey scale, automatic grey scale annotations are added, and color printing stations are disengaged once for the whole print job, and the job can be completed in a more efficient and productive manner when compared to the time needed to disengage the CMY related mechanical apparatus. Further, this approach is superior to simply printing in a monochrome mode because color content is more visibly transmitted to the end user via the automatically inserted annotations. This provides a low cost and efficient means for enabling low cost monochrome printing modes, and is especially useful in competitive bid environments.

While limited examples have been shown in the previously discussed drawings, those ordinarily skilled in the art would understand that many different vehicles may be utilized to draw the user's attention to the previously non-black colored text. In addition, while single color textural descriptions have been used in the foregoing examples, more elaborate textural descriptions (such as "yellow stripes"; "pink and green"; "faded orange"; etc.) can be used to describe color of the feature (or text) before it was changed to a black-based color.

Figure 3:
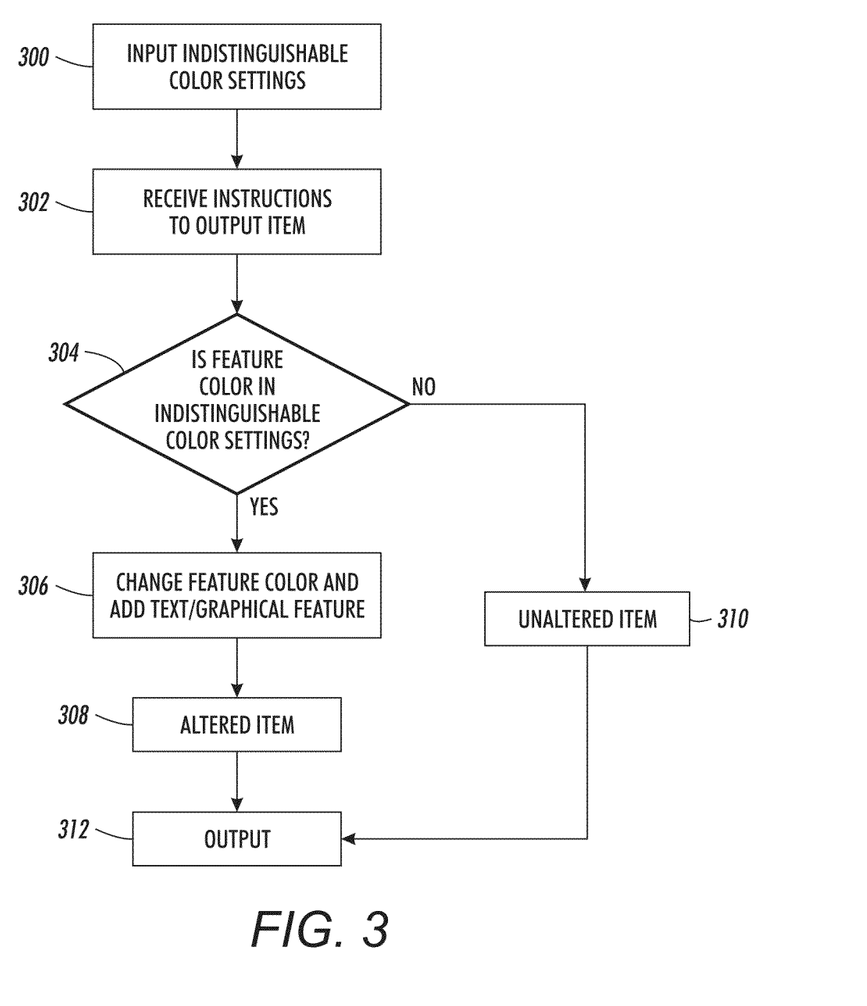
FIG. 3 is a flow diagram of various methods herein.

FIG. 3 is flowchart illustrating exemplary methods herein. In item 300 these methods receive input from the user regarding their colorblindness. For convenience, such inputs are identified sometimes as "indistinguishable color settings." The indistinguishable color settings therefore identify at least one first non-black color that is at least somewhat indistinguishable from at least one second non-black color by a user. Alternatively, the color settings that are input in item 300 could automatically require all color items to be converted to black-based coloring if the entire color content of the print job is below a specified percentage (e.g., less than 10%, less than 25%, etc.) so as to prevent engagement of any CMY related mechanical apparatus during any portion of the print job.

As mentioned previously, these color settings can be input at anytime by user (such as when setting up a print driver, installing a monitor, or establishing or changing device settings) and can be saved for future use. If these color settings are saved, each time a color item is printed or displayed, the methods and devices herein can automatically alter the various items as described below. Alternatively, item 300 can be presented as a menu choice on the graphic user interface of a display or printing device, so that a walk-up user can supply colorblindness information (or preferences to only print in black and white) for the specific item being immediately printed or displayed.

In item 302, these methods receive instructions into the computerized device to output (e.g., print, display, etc.) an item (e.g., a document, a picture, a chart, etc.) has at least one feature (e.g., text, graphical items, etc.). The "feature" has a "feature color" based on a colorant other than a black colorant. For example, the feature can be the colored bars or columns 102, 104 illustrated in the bar chart in FIG. 1A, can be the text 120 illustrated in FIG. 2A, or can be any other element within an item (e.g., document, picture, etc.) that the user has requested to be displayed or printed.

If the feature color included within those colors was identified by the user as not being distinguishable by the user (in the color settings) as determined in item 304, such methods automatically alter the item (306) into an altered item (308) using the computerized device by optionally automatically changing the feature color to a black-based color and automatically adding text to the feature in the altered item using the computerized device. The black-based color is based on the black colorant, and the text describes the feature color. If the feature color was not included within those colors identified by the user as not being distinguishable by the user (not in the color settings) as determined in item 304, such methods leave the item unaltered, and it maintains it's non-black color 310. The unaltered or altered item is then output from the computerized device by being printed, displayed, etc., in item 312.

In item 306, the text can be added over the altered item and/or added adjacent the altered item (see FIGS. 1B and 2B-2F, discussed above). The text can also be surrounded with a graphical feature (e.g., items 132, 142, 152, 162, 172, 182, discussed above). The graphical feature can comprise, for example, lines and/or a shaded region (and such a shaded region can have a black-based color or a non-black-based color).

Figure 4:
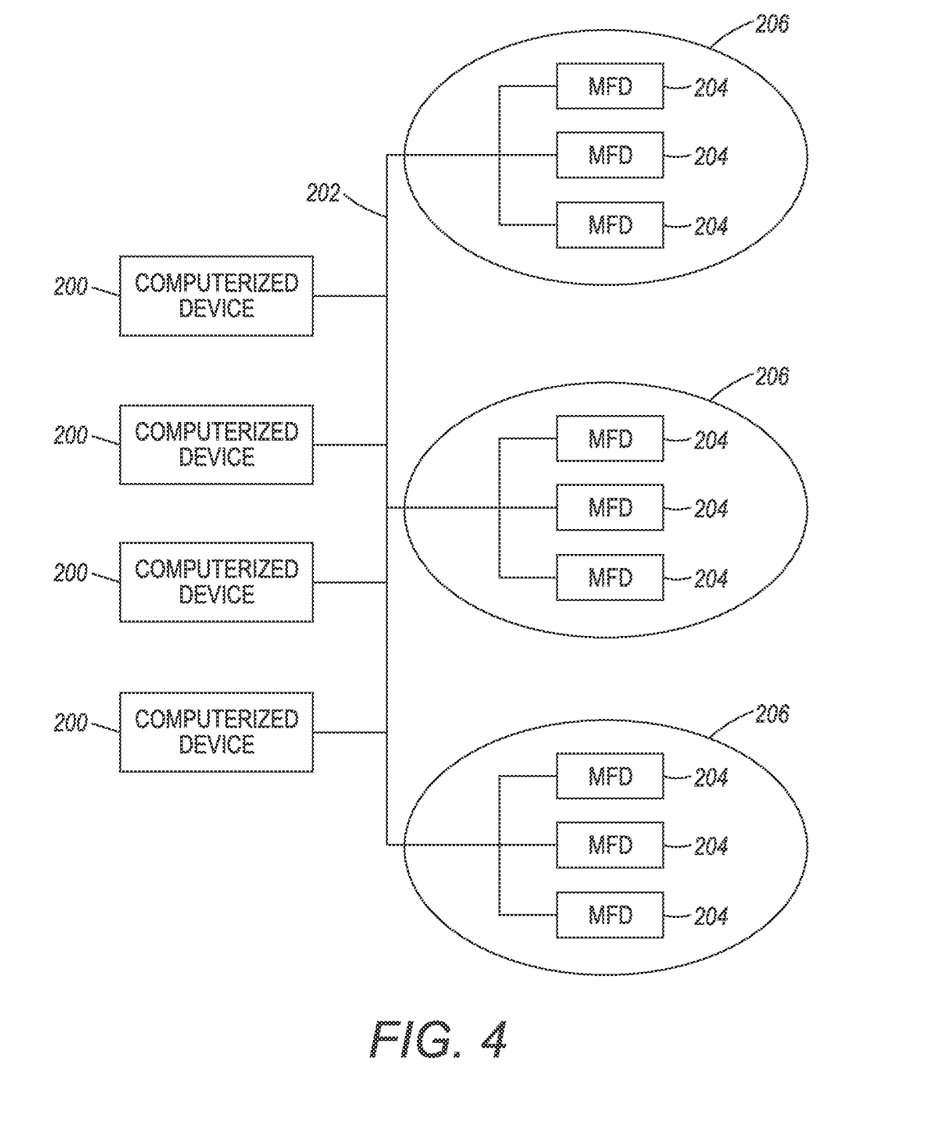
FIG. 4 is a schematic diagram illustrating systems herein.

As shown in FIG. 4, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
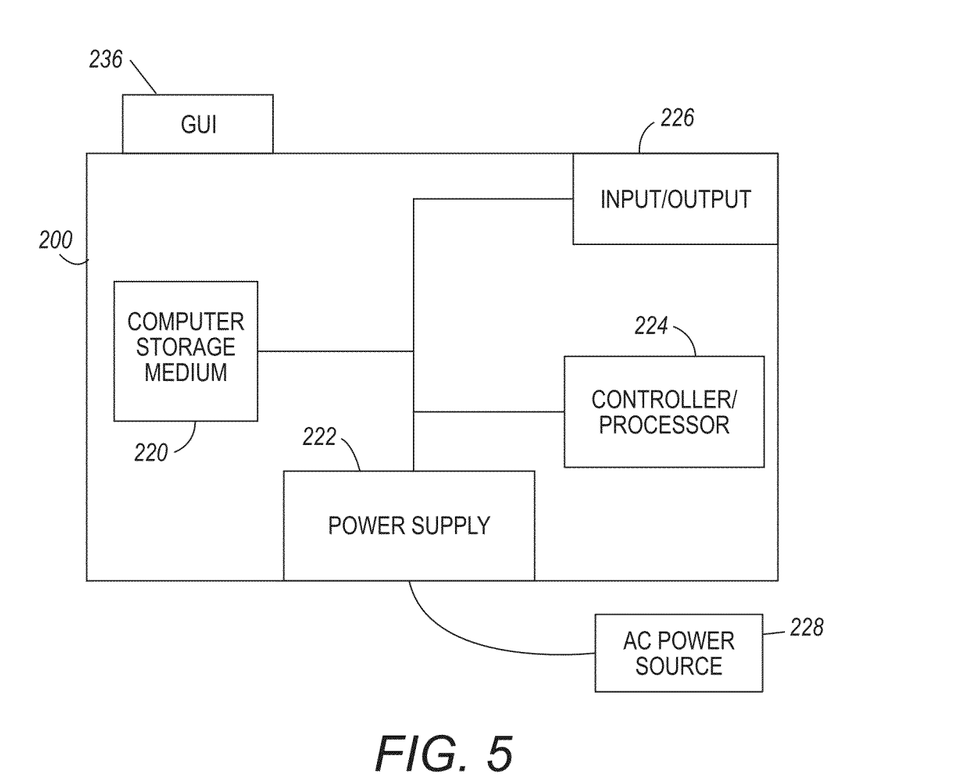
FIG. 5 is a schematic diagram illustrating devices herein.

FIG. 5 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 5, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 6:
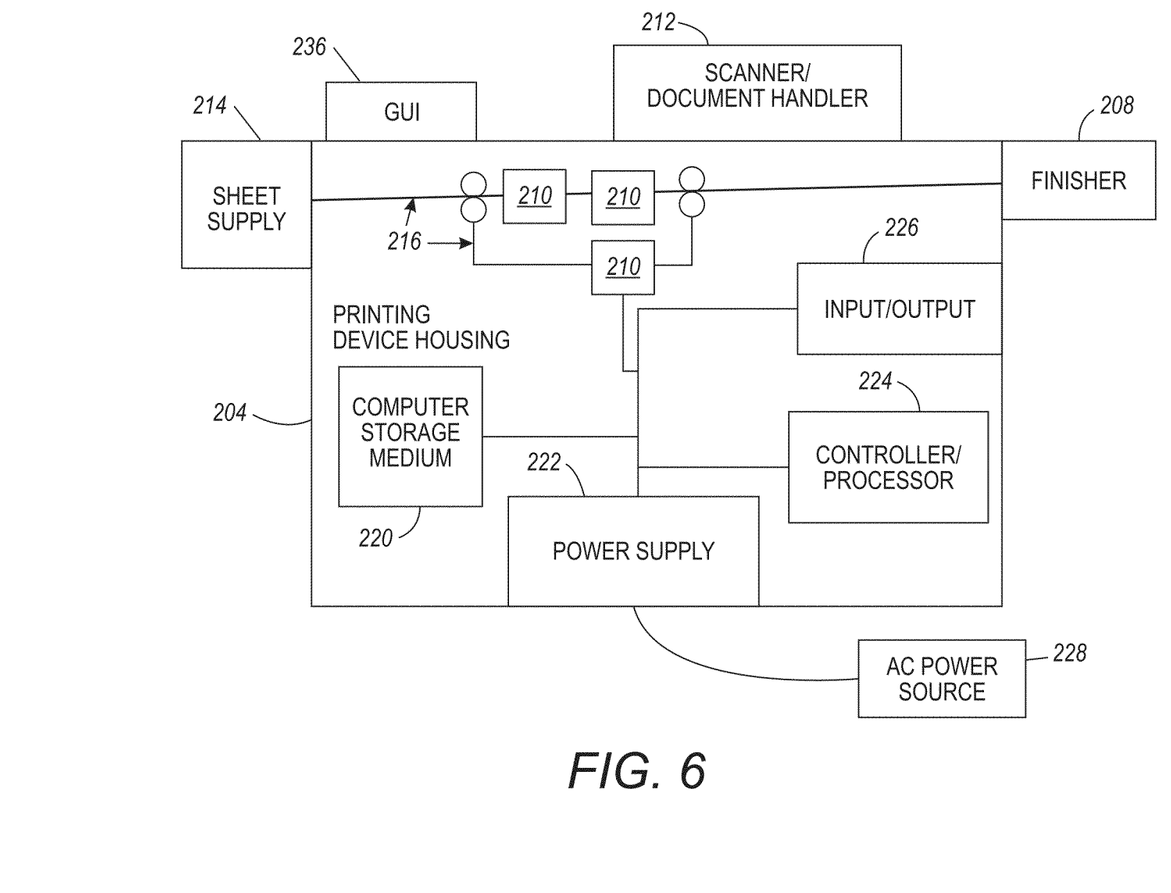
FIG. 6 is a schematic diagram illustrating devices herein.

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, exemplary computerized device embodiments herein include, among other items, a user interface 236 and a processor 224 operatively (meaning directly or indirectly) connected to the user interface 236. The user interface 236 receives indistinguishable color settings. Again, the indistinguishable color settings identify at least one first non-black color that is indistinguishable from at least one second non-black color by a user. The user interface 236 also receives instructions to output an item has at least one feature. Again, the feature has a feature color based on a colorant other than a black colorant.

If the feature color is included as one of the user-indistinguishable colors within the color settings, the processor 224 automatically alters the item into an altered item by optionally changing the feature color to a black-based color and adding text to the feature in the altered item. Again, the black-based color is based on the black colorant and the text describes the feature color. The processor 224 outputs the altered item from the computerized device.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving instructions into a computerized device to output text description having at least one non-black text feature, said non-black text feature having a text color;
   based on said non-black text feature being included within said text description, automatically altering said text description into an altered text description using said computerized device by adding, to said text description, a graphic feature that is sized and positioned to include said non-black text feature in said altered text description, said graphic feature including text describing said text color of said non-black text feature; and
   outputting said altered text description from said computerized device.

2. The method according to claim 1, said adding of said graphic feature comprising one of: adding said text describing said text color of said non-black text feature over said altered text description; and adding said text describing said text color of said non-black text feature adjacent to said altered text description.

3. The method according to claim 1, said adding of said text comprising surrounding said text with said graphical feature.

4. The method according to claim 3, said graphical feature comprising at least one of lines and a shaded region.

5. The method according to claim 1, said outputting comprising one of displaying and printing said altered text description.

6. A method comprising:
   receiving instructions into a computerized device to output text description having at least one non-black text feature, said non-black text feature having a text color based on a colorant other than a black colorant;
   based on said non-black text feature being included within said text description, automatically altering said text description into an altered text description using said computerized device by changing said text color to a black-based color and adding, to said text description, a graphic feature that is sized and positioned to include said non-black text feature in said altered text description using said computerized device, said black-based color being based on said black colorant, and said graphic feature including text describing said text color of said non-black text feature; and
   outputting said altered text description from said computerized device.

7. The method according to claim 6, said adding of said text comprising one of: adding said text over said altered text description; and adding said text adjacent said altered text description.

8. The method according to claim 6, said adding of said text comprising surrounding said text with said graphical feature.

9. The method according to claim 8, said graphical feature comprising at least one of lines and a shaded region.

10. The method according to claim 6, said outputting comprising one of displaying and printing said altered text description.

11. A computerized device comprising:
    a user interface; and
    a processor operatively connected to said user interface,
    said user interface receiving instructions to output text description having at least one non-black text feature,
    said non-black text feature having a text color,
    based on said non-black text feature being included within said text description, said processor automatically altering said text description into an altered text description by adding, to said text description, a graphic feature that is sized and positioned to include said non-black text feature in said altered text description,
    said graphic feature including text describing said text color of said non-black text feature, and
    said processor outputting said altered text description from said computerized device.

12. The computerized device according to claim 11, said adding of said graphic feature comprising one of: adding said text describing said text color of said non-black text feature over said altered text description; and adding said text describing said text color of said non-black feature adjacent said altered text description.

13. The computerized device according to claim 11, said adding of said text comprising surrounding said text with said graphical feature.

14. The computerized device according to claim 13, said graphical feature comprising at least one of lines and a shaded region.

15. The computerized device according to claim 11, said outputting comprising one of displaying and printing said altered text description.

16. A computerized device comprising:
    a user interface; and
    a processor operatively connected to said user interface,
    said user interface receiving instructions to output text description having at least one non-black text feature,
    said non-black text feature having a feature text color based on a colorant other than a black colorant,
    based on said non-black text feature being included within said text description, said processor automatically altering said text description into an altered text description using said computerized device by changing said text color to a black-based color and adding, to said text description, a graphic feature that is sized and positioned to include said non-black text feature in said altered text description,
    said black-based color being based on said black colorant,
    said graphic feature including text describing said text color of said non-black text feature, and said processor outputting said altered text description from said computerized device.

17. The computerized device according to claim 16, said adding of said text comprising one of: adding said text over said altered text description; and adding said text adjacent said altered text description.

18. The computerized device according to claim 16, said adding of said text comprising surrounding said text with said graphical feature.

19. The computerized device according to claim 18, said graphical feature comprising at least one of lines and a shaded region.

20. The computerized device according to claim 16, said outputting comprising one of displaying and printing said altered text description.

* * * * *